United States Patent [19]
Park et al.

[11] Patent Number: 5,872,885
[45] Date of Patent: Feb. 16, 1999

[54] HIGH SPEED SEARCH DEVICE FOR STANDARD DEFINITION VIDEO CASSETTE RECORDER

[75] Inventors: Se-Kap Park, Suwon; Byeong-Soo Kim, Kwacheon, both of Rep. of Korea

[73] Assignee: Samsung Electronics Co., Ltd., Kyungki-do, Rep. of Korea

[21] Appl. No.: 777,382

[22] Filed: Dec. 27, 1996

[30] Foreign Application Priority Data

Dec. 27, 1995 [KR] Rep. of Korea ................... 1995/59417

[51] Int. Cl.$^6$ ................................................... H04N 5/783
[52] U.S. Cl. ............................ 386/69; 386/109; 386/124; 360/72.1; 360/8
[58] Field of Search ................................. 386/1, 6–8, 40, 386/69, 70, 109, 111–112, 33, 124; 360/8, 72.1, 72.2, 72.3; 369/32, 44.28, 44.29, 44.31; H04N 5/76, 5/783, 5/92, 9/79

[56] References Cited

U.S. PATENT DOCUMENTS

| | | | |
|---|---|---|---|
| 5,432,613 | 7/1995 | Lee | 386/112 |
| 5,493,414 | 2/1996 | Inoue et al. | 386/112 |
| 5,532,837 | 7/1996 | Ootaka et al. | 386/112 |

*Primary Examiner*—Thai Tran
*Attorney, Agent, or Firm*—Sughrue, Mion, Zinn, Macpeak & Seas, PLLC

[57] ABSTRACT

A high speed search device for a video cassette recorder including a first data compressing unit for receiving data in units of predetermined bits and compressing the data so as to reduce it into a predetermined amount, an error correcting code inserting unit for inserting an error correcting code between the data, a modulator for modulating the data coded in accordance with a recording type, a record signal amplifier for amplifying the modulated data, a recording medium for recording the amplified data, a reproduction signal amplifier for amplifying the recorded data for reproduction, a demodulator for demodulating the data into its original form. The device further includes an error correcting/decoding unit for correcting and decoding the output of the demodulator with the inserted error correcting code, a first data decompressing unit for decompressing the compressed data into its original form, a second compressing unit for compressing the input data into a predetermined amount of data, a first cassette memory unit for storing the compressed data in a memory of a cassette, a second cassette memory unit for storing previous data, a second data decompressing unit for decompressing the data stored in the memory, and a micro-computer for controlling storage and decompression of data.

2 Claims, 1 Drawing Sheet

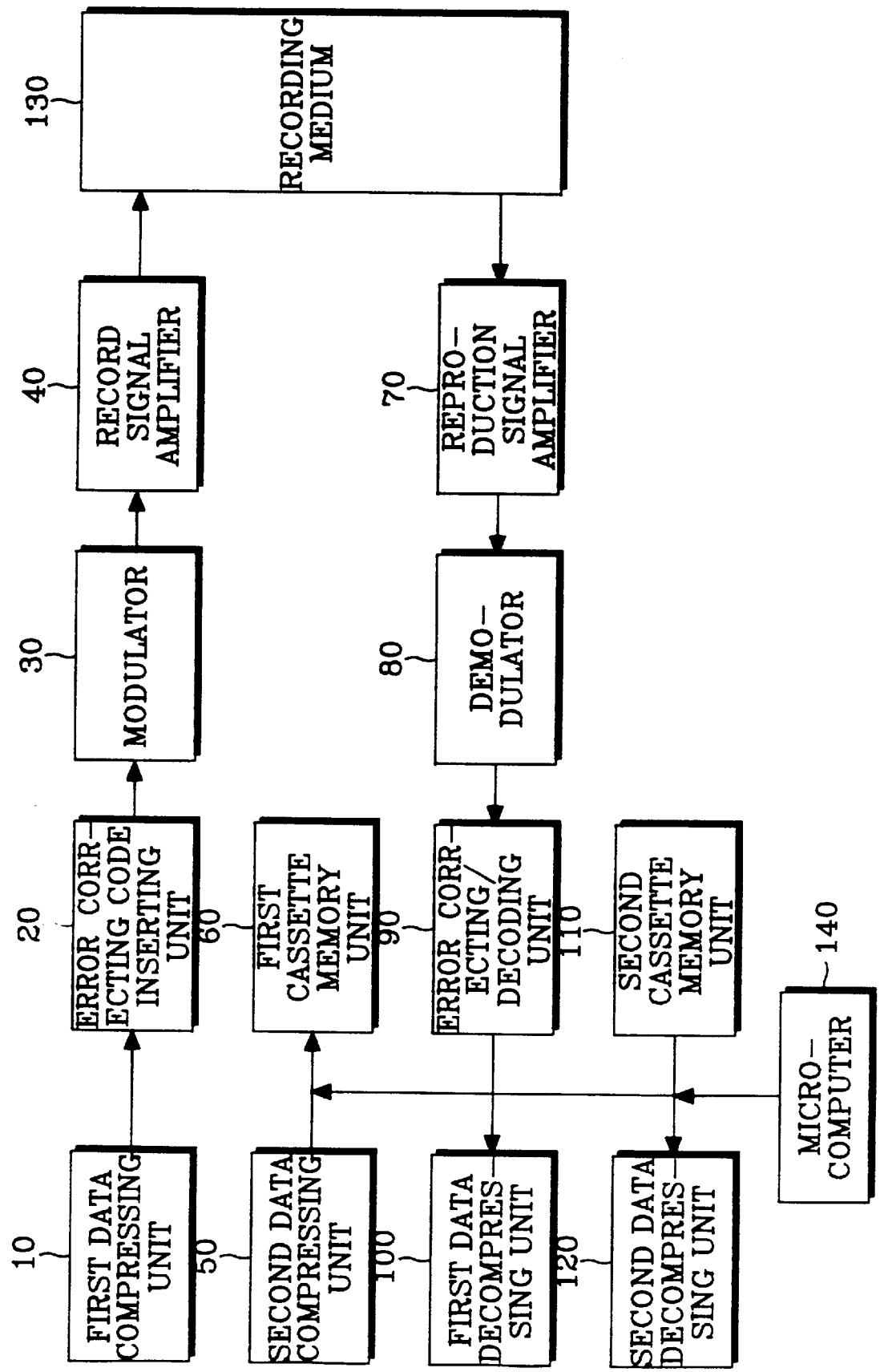

HIGH SPEED SEARCH DEVICE FOR STANDARD DEFINITION VIDEO CASSETTE RECORDER

BACKGROUND OF THE INVENTION

1. Field of the Invention

The present invention relates to a video cassette recorder, and more particularly, to a high speed search device for a standard definition video cassette recorder.

The present application is based on Korean Application No. 59417/1995 which is incorporated herein by reference.

2. Description of the Related Art

During development of digital video signal processing, it was discovered that full digital processing could be performed in a video cassette recorder (VCR). As a result of this discovery, a standard digital VCR (Standard Definition VCR: SD-VCR) was developed through an international conference of manufacturers from various countries. Reproduction tapes can be used with the SD-VCR only when the reproduction tape, are recorded and reproduced according to a process defined for the SD-VCR reproduction tape.

The SD-VCR is a complex device which can be used for various purposes. It is generally used as a camcorder. The SD-VCR has a high density and high bandwidth forms and an option for using a secondary memory of a computer in the future. The digital camcorder includes a function which provides for still video images.

According to the prior art, when there are many scenes recorded on a video, it is difficult to locate a specific scene or image of the video. The process for locating a specific image requires a significant amount of time because the data recorded in the memory of the cassette contains only the date and time when the scene was photographed in a photo mode, and the photographed position of the scene on the tape.

SUMMARY OF THE INVENTION

Accordingly, an object of the present invention is to provide a high speed search device for a video cassette recorder, which reduces the amount of data by compressing image data of an image photographed in the photo mode, and which records the compressed data on a tape and stores the image data in a cassette memory unit during the recording process.

Another object of the present invention is to provide a high speed search device for a video cassette recorder for locating specific scenes or images, and for viewing the photographed scenes themselves, as well as an index, by restoring the scenes stored in the cassette memory unit by decompressing the data.

A further object of the present invention is to provide a high speed search device for a video cassette recorder which records a first scene orimage of a recording in the cassette memory unit during general recording, as well as during photo mode recording, in order to easily find a specific scene without searching the entire tape during reproduction.

To accomplish the above-described objects, a high speed search device for a video cassette recorder in accordance with the present invention comprises a first data compressing unit for receiving data in units of predetermined bits from an external system and for compressing the data so as to reduce the data by a predetermined amount, an error correcting code inserting unit, connected to the first data compressing unit, for inserting an error correcting code between the compressed data, and a modulator connected to the error correcting code inserting unit for modulating the data coded in accordance with a recording type. The high speed search device further includes a record signal amplifier, connected to the modulator, for amplifying the modulated data, and a recording medium for recording the amplified data. A reproduction signal amplifier amplifyies the recorded data during reproduction, and a demodulator demodulates the reproduced data into its original form. An error correcting/decoding unit corrects and decodes the signal output from the demodulator with the inserted error correcting code. A first data decompressing unit is connected to the error correcting/decoding unit for decompressing the compressed data into its original form. In addition, a second compressing unit is provided for compressing the input data into a predetermined amount of data, and a first cassette memory unit is connected to the second compressing unit for storing the compressed data. A second cassette memory unit is provided for storing previous data, and a second data decompressing unit is connected to the second cassette memory unit for decompressing the data stored in the second cassette memory unit. A micro-computer, connected between the second data compressing unit and the first cassette memory unit, and between the second data compressing unit and the second cassette memory unit, controls the storage and compression of data.

BRIEF DESCRIPTION OF THE DRAWINGS

The FIGURE illustrates a block diagram of a video cassette recorder according to the present invention.

DETAILED DESCRIPTION OF PREFERRED EMBODIMENTS

A detailed description of the preferred embodiment of the present invention is set forth below with reference to the attached drawing.

The present invention improves upon conventional definition video cassette recorders by providing a second data compressing unit 50, a second data decompressing unit 120, and a micro-computer 140.

As shown in the FIGURE, the present invention comprises a first data compressing unit 10 for receiving data in units of predetermined bits and for compressing the data so as to reduce it by a predetermined amount. An error correcting code inserting unit 20 inserts an error correcting code between the data, a modulator 30 modulates the data coded in accordance with a recording type, a record signal amplifier 40 amplifies the modulated data, and a recording medium 130 records the amplified data. A reproduction signal amplifier 70, connected to the recording medium 130, amplifies the recorded data for reproduction and supplies the amplified data to a demodulator 80 which demodulates the modulated data into its original form. An error correcting/decoding unit 90, connected to the demodulator 80, corrects and decodes the output of the demodulator in accordance with the inserted error correcting code, and a first data decompressing unit 100 decompresses the compressed data into its original form. The video cassette recorder also includes a second compressing unit 50 for compressing the input data into a predetermined amount of data, a first cassette memory unit 60 for storing the compressed data output from the second data compressing unit, a second cassette memory unit 110 for storing previous data, a second data decompressing unit 120, connected to the second cassette memory unit 110, for decompressing the data stored in the memory unit 110, and a micro-computer (MICOM) 140, connected between the second data compressing unit 50 and the first cassette memory unit 60, and between the second data decompressing unit 120 and the second cassette memory unit 110, for controlling the storage and decompression of the data.

In the conventional definition cassette recorder, the cassette memory only records the time code such as the date and time an image was photographed in the photo mode, and the position of the image on the tape or recording medium. Consequently, it is very inconvenient to use the conventional definition cassette recorder to observe specific images.

The present invention includes the second data compressing unit 50 for compressing the input images which are recorded in the first cassette memory unit 60. Thus, the first cassette memory unit 60 can record the actual photographed images in the form of compressed data as well as the time code, so that users can find the specific scene or image more conveniently. To achieve this, the second data compressing unit 50 compresses the input data, together with the first data compressing unit 10 recording the input data on the tape or recording medium 130, and the first cassette memory unit 60 stores the compressed data. The data stored in the first cassette memory unit 60 does not have to pass by the error correction code (ECC) inserting unit 20 because the data does not contain an error. Consequently, no data is added so that there is no need to increase the capacity of the first cassette memory unit. The recorded position on the tape, time code, and other data as well as the compressed image data can be stored in the first cassette memory unit, and users can immediately find the image which they want to see during reproduction using the information stored in the first cassette memory unit 60.

The description of the invention set forth herein is not limited to the photo mode. For example, when users perform recording for some length of time at some place, the first scene is recorded in the first cassette memory unit as a representative scene. Then it is possible to search images easily.

Therefore, it should be understood that the present invention is not limited to the particular embodiment disclosed herein. While the invention has been described in detail and with reference to specific embodiments, it will be apparent to one skilled in the art that various modifications can be made without departing from the spirit and scope of the invention.

What is claimed is:

1. A high speed search device for a video cassette recorder, comprising:

a first data compressing unit for receiving input data, in units of a predetermined number of bits, from an external system, and for compressing said input data by a predetermined amount to obtain compressed input data;

an error correcting code inserting unit, connected to said first data compressing unit, for inserting an error correcting code between said compressed input data;

a modulator which modulates said compressed input data, output from said error correcting code inserting unit, in accordance with a recording type and which outputs modulated data;

a record signal amplifier for amplifying said modulated data;

a recording medium for recording said modulated data output from said record signal amplifier;

a reproduction signal amplifier for amplifying said modulated data reproduced from said recording medium and for outputting reproduced data;

a demodulator for demodulating said reproduced data;

an error correcting/decoding unit, connected to said demodulator, for correcting and decoding said reproduced data output from said demodulator in accordance with said error correcting code;

a first data decompressing unit for decompressing said reproduced data output from said error correcting/decoding unit;

a second compressing unit for compressing said input data into a predetermined amount of data to obtain compressed data;

a first cassette memory unit, connected to said second compressing unit, for storing said compressed data;

a second cassette memory unit for storing previously compressed data;

a second data decompressing unit, connected to said second cassette memory unit, for decompressing said previously compressed data stored in said second cassette memory unit; and a microcomputer, connected between said second data compressing unit and said first cassette memory unit, and between said second data decompressing unit and said second cassette memory unit, for controlling storage and decompression operations.

2. The high speed search device according to claim 1, wherein said input data is image data, said first data compressing unit being arranged to receive said image data.

\* \* \* \* \*